(12) United States Patent
Sakai et al.

(10) Patent No.: US 7,699,244 B2
(45) Date of Patent: Apr. 20, 2010

(54) CLEANING DEVICE FOR A VEHICULAR LAMP

(75) Inventors: Masaru Sakai, Shizuoka (JP); Masaaki Sato, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 988 days.

(21) Appl. No.: 11/446,067

(22) Filed: Jun. 2, 2006

(65) Prior Publication Data

US 2006/0289678 A1 Dec. 28, 2006

(30) Foreign Application Priority Data

Jun. 3, 2005 (JP) .............................. 2005-164063

(51) Int. Cl.
*B60S 1/60* (2006.01)
(52) U.S. Cl. ................. 239/284.2; 239/284.1; 239/288; 15/250.002
(58) Field of Classification Search ............ 15/250.002, 15/256.5; 160/113; 24/67.9; 248/297.21; 411/174
See application file for complete search history.

(56) References Cited

U.S. PATENT DOCUMENTS

| 4,449,562 | A | * | 5/1984 | Leivenzon et al. .......... 160/113 |
| 4,623,050 | A | * | 11/1986 | Copp .......................... 188/340 |
| 4,938,444 | A | * | 7/1990 | Worrallo ................. 248/297.21 |
| 5,309,605 | A | * | 5/1994 | Sato ............................ 24/67.9 |
| 5,738,179 | A | * | 4/1998 | Matsui .................... 180/69.21 |
| 6,793,153 | B2 | * | 9/2004 | Hirose et al. ............. 239/284.1 |
| 2003/0116645 | A1 | | 6/2003 | Hirose et al. |
| 2004/0003726 | A1 | * | 1/2004 | Geberzahn et al. ............ 99/426 |
| 2006/0064842 | A1 | * | 3/2006 | Verelst et al. .............. 15/256.5 |

FOREIGN PATENT DOCUMENTS

JP 2003-182536 7/2003

* cited by examiner

*Primary Examiner*—Monica S Carter
*Assistant Examiner*—Stephanie Newton
(74) *Attorney, Agent, or Firm*—William L. Androlia; H. Henry Koda (57) ABSTRACT

A cleaning device for cleaning the front cover lens of a vehicular lamp, including a bracket 8 that is attached to the cylinder of a spray nozzle 5 and positions the cylinder in the opening formed in a vehicle body, a fixing member 9 that covers the bracket, and an elastic member (a clip spring) 101 disposed between the bracket and the fixing member. Engagement pieces 83*b* and 84*a* of a pair of arm elements 83 and 84 of the bracket engage the front (outer) side of the opening, a plurality of contact portions 92*a*, 93*a*, 94*a* and 95*a* of the fixing member are in contact with the rear (inner) side of the opening, and the elastic member interposed between the bracket and the fixing member urges the fixing member toward the opening, thus securing the bracket to the opening.

5 Claims, 9 Drawing Sheets

CLEANING DEVICE FOR A VEHICULAR LAMP

BACKGROUND OF THE INVENTION

1. Field of the Invention

The present invention relates to a cleaning device for a vehicular lamp and more particularly to a cleaning device for cleaning the font cover of a vehicular lamp.

2. Description of the Related Art

A cleaning device for a vehicular lamp is mounted in a vehicle such as an automobile and cleans off the dirt on the front cover (front cover lens) of, for instance, a headlamp.

The cleaning device for a vehicular lamp typically has a spray nozzle on the distal end portion of a piston, which is driven by a cylinder. With the piston projected out of the cylinder, cleaning fluid (water) supplied via the internal portion of the cylinder and piston is sprayed from the spray nozzle toward the front cover lens of a vehicular lamp.

When not used, the piston is retracted inside the cylinder, and the spray nozzle is accordingly positioned at a standby position in a vehicle body, in other words, in, for example, the inside of an opening formed in, for instance, the bumper. When the cleaning device is used, the spray nozzle is extended out of the opening to a use position. However, if the cylinder is not adequately positioned with respect to the opening, the moving path of the spray nozzle caused by the movement of the piston becomes unstable, causing a problem that the spray nozzle and piston hit the edge of the opening or the like. Therefore, it is critical that the cylinder is accurately positioned with respect to the opening.

In the cleaning device for a vehicular lamp disclosed in Japanese Patent Application Laid-Open (Kokai) No. 2003-182536, tabs (46*c*), which are formed at the distal ends of the engagement positioning portions (46) of a bracket (38) that is attached to the front end portion of a cylinder, are engaged with the front surface of the edge portions of an opening (37) that are located at mutually opposed locations; in addition, the distal end portions of flat plate pieces (47) formed on the bracket (38) are set to contact with the edge portions of the opening that face the direction substantially at a 90-degree angle with respect to the edge portions of the opening with which the tabs (46*c*) are engaged. The front end portion of the bracket (38) is thus positioned at the opening; and attachment pieces (41) formed on the bracket (38) are secured by bolts to the vehicle body at locations away from the opening (37). The numbers in parentheses in the above and below descriptions are the reference numerals used in (the drawings of) Japanese Patent Application Laid-Open (Kokai) No. 2003-182536.

As seen from the above, positioning of the front end portion of the bracket (38) is made with respect to the opening (37) in the above-described cleaning device; as a result, positioning of the spray nozzle with respect to the opening (37) is made indirectly.

In the cleaning device of the above-described Japanese Patent Application Laid-Open (Kokai) No. 2003-182536, engagement of the front end portion of the bracket (38) with the opening (37) in the longitudinal direction is made only by the tabs (46*c*) that are engaged with the front surface of the edge portions of the opening. Accordingly, if the positions where the attachment pieces (41) are fixed and the location of the opening (37) are not accurately positioned (or aligned), excess force is likely to be applied to the tabs (46*c*) and engagement positioning portions (46), and the tabs (46*c*) are lifted (or separated) from the front surface of the edge portions of the opening (37), thus deteriorating the positioning state of the bracket. Deflection of the engagement positioning portions (46) that occurs in the direction of the center of the opening (37) also causes the tabs (46*c*) to be disengaged from the edge portions of the opening (37).

BRIEF SUMMARY OF THE INVENTION

Accordingly, the object of the present invention is to provide a cleaning device for a vehicular lamp which is free of looseness that would occur between the opening, which is formed in a vehicle body and through which the spray nozzle at the end of a piston extends and retracts, and a cylinder, which is attached to the opening, and is free of localized excess force that would applied on components of the cleaning device.

The above object is accomplished by a unique structure of the present inveniton for a cleaning device for a vehicular lamp that includes:

a bracket that is attached to a cylinder and positions the cylinder in an opening formed in, for instance, a vehicle body, a fixing member that is positioned on the bracket in an outwardly fitted manner for positionally securing the bracket, and an elastic member that is disposed between the bracket and the fixing member; and in this structure:

the bracket has a pair of arm elements having engagement pieces that engage with the front side of edge portions of the opening that are positioned mutually opposed, at least one of the arm elements being an elastic arm element having elasticity in a direction of engagement and disengagement with respect to the edge portion of the opening, and the fixing member has a plurality of contact portions, which are in contact with rear side of the edge portions of the opening, and a deflection control portion, which controls (prevents) the deflection of the elastic arm element in a direction of disengagement from the opening; and further, the edge portions of the opening are held by the engagement pieces of the bracket and the contact portions of the fixing member, and the elastic member is interposed between the bracket and the fixing member such that the fixing member is biased toward the opening in a state that the deflection control portion of the fixing member prevents the deflection of the elastic arm element of the bracket.

Accordingly, in the cleaning device for a vehicular lamp of the present invention, looseness is prevented from occurring between the opening of the vehicle body and the cylinder (more specifically, the bracket attached to the cylinder) attached to the opening.

More specifically, the above object is accomplished by a unique structure of the present invention for a cleaning device for a vehicular lamp that includes:

a piston provided at a distal end thereof with a spray nozzle that sprays a cleaning fluid and a nozzle cover that forwardly covers the spray nozzle, and a cylinder that drives the piston to extend and retract with respect to an opening formed in, for instance, a vehicle body; and in the present invention, the cleaning device further includes:

a bracket that is attached to the cylinder and positions the cylinder in the opening of the vehicle body, a fixing member that is positioned on the bracket in an outwardly fitted manner for positionally securing the bracket, and an elastic member that is disposed between the bracket and the fixing member; and in this structure:

the bracket has a pair of arm elements that have engagement pieces for engaging with the front side of edge portions of the opening that are positioned mutually opposed, at least one of the arm elements being an elastic arm element having elasticity in a direction of engagement and disengagement with respect to the edge portion of the opening, and the fixing member has a plurality of contact portions, which are in contact with rear side of the edge portions of the opening, and a deflection control portion, which controls (prevents) the deflection of the elastic arm element in a direction of disengagement from the opening; and further, the edge portions of the opening are held by the engagement pieces of the bracket and the contact portions of the fixing member, and the elastic member is interposed between the bracket and the fixing member such that the fixing member is biased toward the opening in a state that the deflection control portion of the fixing member prevents the deflection of the elastic arm element of the bracket.

Accordingly, in the cleaning device of the present invention, the edge portions of the opening are held from the front and behind by the engagement pieces of the bracket and the contact portions of the fixing member. As a result, the front end portion of the bracket is positioned and fixed (or positionally secured) to the opening, no localized load is applied to only some members or portions, and deflection in a direction of disengaging the elastic arm element from the edge portion is prevented. Consequently, the front end portion of the bracket does not become misaligned with respect to the opening.

Furthermore, in the cleaning device of the present invention:

the engagement pieces of the two arm elements are engaged with the front side of the edge portions of the opening in a state that the elastic arm element which is one of such two arm elements is deflected toward the other arm element, and the fixing member is subsequently positioned to the bracket from behind in an outwardly fitted manner (or the fixing member is brought to cover the bracket from behind), so that the deflection control portion of the fixing member is inserted to a position at which the deflection control portion prevents the deflection of the elastic arm element of the bracket.

Accordingly, work to position and fix the bracket to the opening can be performed easily.

In addition, in the cleaning device of the present invention, the other arm element (than the elastic arm element) has rigidity that substantially prevents the deflection in the direction of making engagement and disengagement with the edge portion of the opening, and the other arm element is formed with a holding piece that is in contact with the rear side of the edge portion of the opening in order to sandwich the edge portion from front and behind in cooperation with the engagement piece.

Accordingly, the other arm element (or a rigid arm element) that has the holding piece in addition to the engagement piece is assuredly engaged with the edge portion of the opening, and the front end portion of the bracket is thus prevented from being misaligned with (or separated from) the edge portion of the opening.

Furthermore, in the cleaning device of the present invention:

the rear end portion of the fixing member has an operation surface that faces substantially parallel to a flat support surface formed on the bracket, and the elastic member is a spring interposed between the support surface of the bracket and the operation surface of the fixing member Accordingly, the front end portion of the bracket can be easily engaged and disengaged with the opening; and once the front end portion of the bracket engages the opening, the engagement state is kept assuredly.

DETAILED DESCRIPTION OF THE INVENTION

Hereinafter, the best mode for carrying out the cleaning device for a vehicular lamp of the present invention will be described with reference to the accompanying drawings.

First, the outline of the cleaning device for a vehicular lamp will be described.

Figure 1:
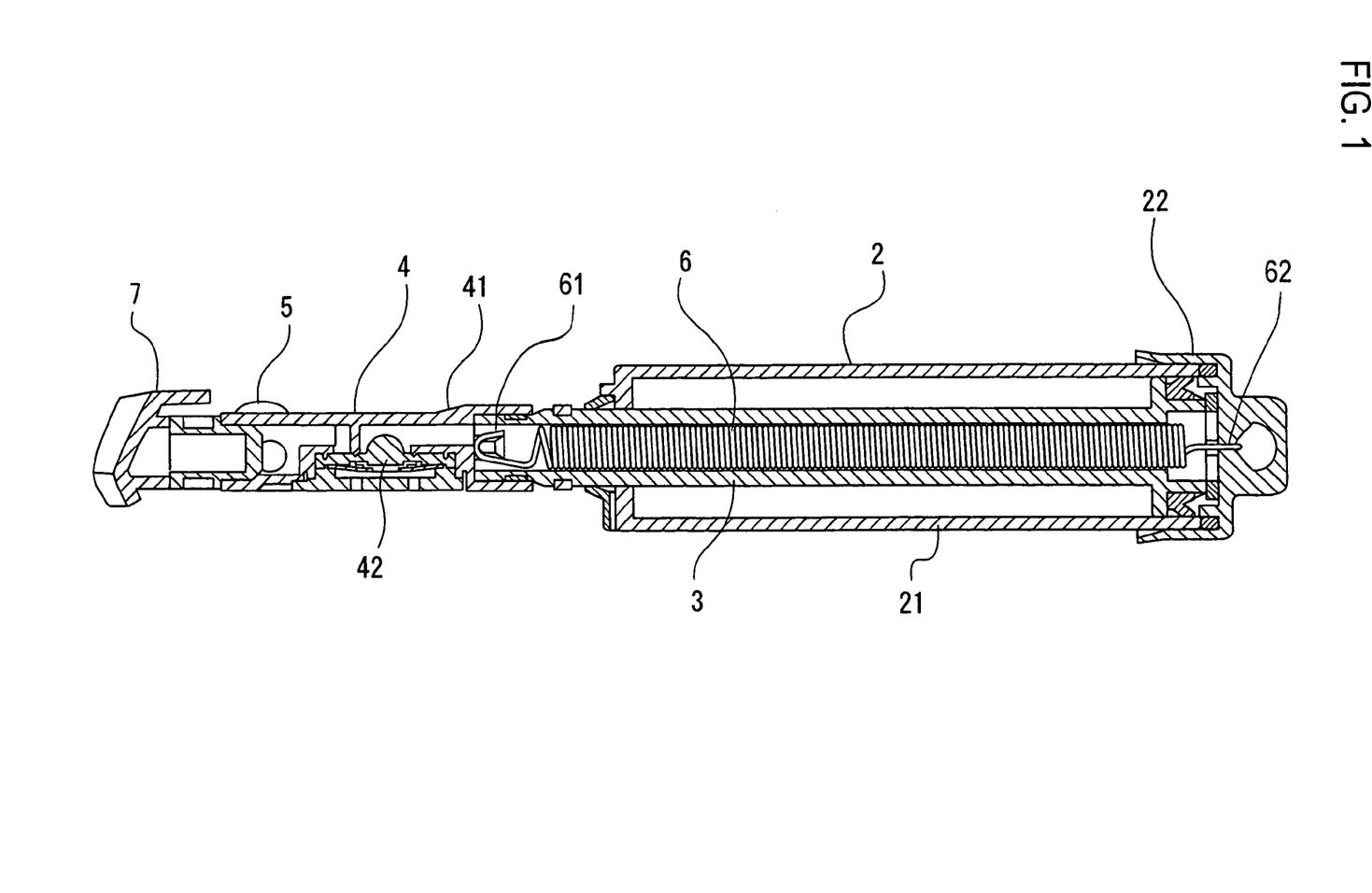
FIG. 1 shows in vertically cross-section one embodiment of the cleaning device for a vehicular lamp according to the present invention with the bracket and fixing member being omitted.

FIG. 1 is a vertical cross-sectional view of the cleaning device 1 for a vehicular lamp without a bracket attached to it.

The cleaning device 1 for a vehicular lamp has a cylinder 2, a piston 3 slidably connected to the cylinder 2, and a spray nozzle 5 connected to the distal end of the piston 3 with a check valve portion 4 in between.

The cylinder 2 includes a cylinder main portion 21, which is substantially a cylinder, and a joint portion 22, which closes the rear end of the cylinder main portion 21. The front end portion on the outer peripheral surface of the cylinder main portion 21 is formed with a plurality of engagement projections 21a (see FIGS. 3 and 8) that are spacedly provided in the circumferential direction of the cylinder main portion 21.

The piston 3 is slidably engaged with the cylinder 2. The piston 3 is formed in a substantially cylindrical shape.

An extension coil spring 6 is disposed inside the piston 3. Hooks 61 and 62 are formed at the front and rear end of the extension coil spring 6, and they are respectively held by the front end portion of the piston 3 and the rear end portion of the cylinder 2. Accordingly, the piston 3 is biased in a direction of retracting the piston 3 into the cylinder 2.

A check valve portion 4 is connected to the front end portion of the piston 3, and disposed in the check valve body 41 of the check valve portion 4 is a check valve 42. In addition, the check valve body 41 has nozzle supporting portions 43 (see FIG. 2), and spray nozzles 5 are provided on the check valve body 41.

Reference numeral 7 denotes a nozzle cover provided at the front end of the check valve portion 4.

In the vehicular lamp cleaning device 1 described above, cleaning fluid (water) is supplied to the rear end internal portion of the cylinder 2 via a cleaning fluid (water) supply duct 22a (see FIGS. 3 and 8) provided in the joint portion 22 of the cylinder 2. When supplied, the cleaning fluid passes through the internal portion of the piston 3 and fills up to the check valve 42. The pressure of the cleaning fluid extends the extension coil spring 6 such that the piston 3 extends out from (or is driven out of) the cylinder 2. When the pressure of the cleaning fluid in front of the check valve 42 exceeds the durable pressure of the check valve 42, the check valve 42 opens. Cleaning fluid as a result reaches the spray nozzles 5 and is sprayed out from the nozzle holes of the spray nozzles 5.

The cylinder 2 is positioned and fixed (or positionally secured) to an opening 11 provided in a vehicle body 10 using a fixing member 9, via a bracket 8 that is attached to the cylinder 2. The "vehicle body 10" here is substantially a bumper of a vehicle; however, the "vehicle body 10" is not limited to a bumper, and it can be other than a bumper such as a headlamp rim or the like.

The bracket 8 has at its rear end portion an attachment portion 81 of substantially a cylindrical shape, and a positioning portion 82 is provided on the front side of the attachment portion 81.

A supporting plate 81b that projects outward is formed on the rear end of the attachment portion 81. The front surface 81c of the supporting plate 81b acts as a flat support surface that is substantially perpendicular to an axis of the cylinder 2.

The attachment portion 81 of the bracket 8 is provided with a plurality of engagement holes 81a with spaces in between in the circumferential direction. The attachment portion 81 is outwardly fitted to the front end portion of the cylinder 2, and the engagement holes 81a of the attachment portion 81 are engaged with the engagement projections 21a of the cylinder 2. The bracket 8 is thus fixed to the front end portion of the cylinder 2.

The base portion 82a of the positioning portion 82 has a rectangular tube shape when viewed in the longitudinal direction, and two (or a pair of) engagement arm elements 83 and 84 are formed so as to project forward from the front ends of the portions that are along the shorter sides of the base portion 82a. In addition, as best seen from FIG. 7, four positioning pieces 85 and 86 are provided so as to project forward from the mutually separated positions on the front ends of the portions along the longer sides of the base portion 82a.

Figure 6:
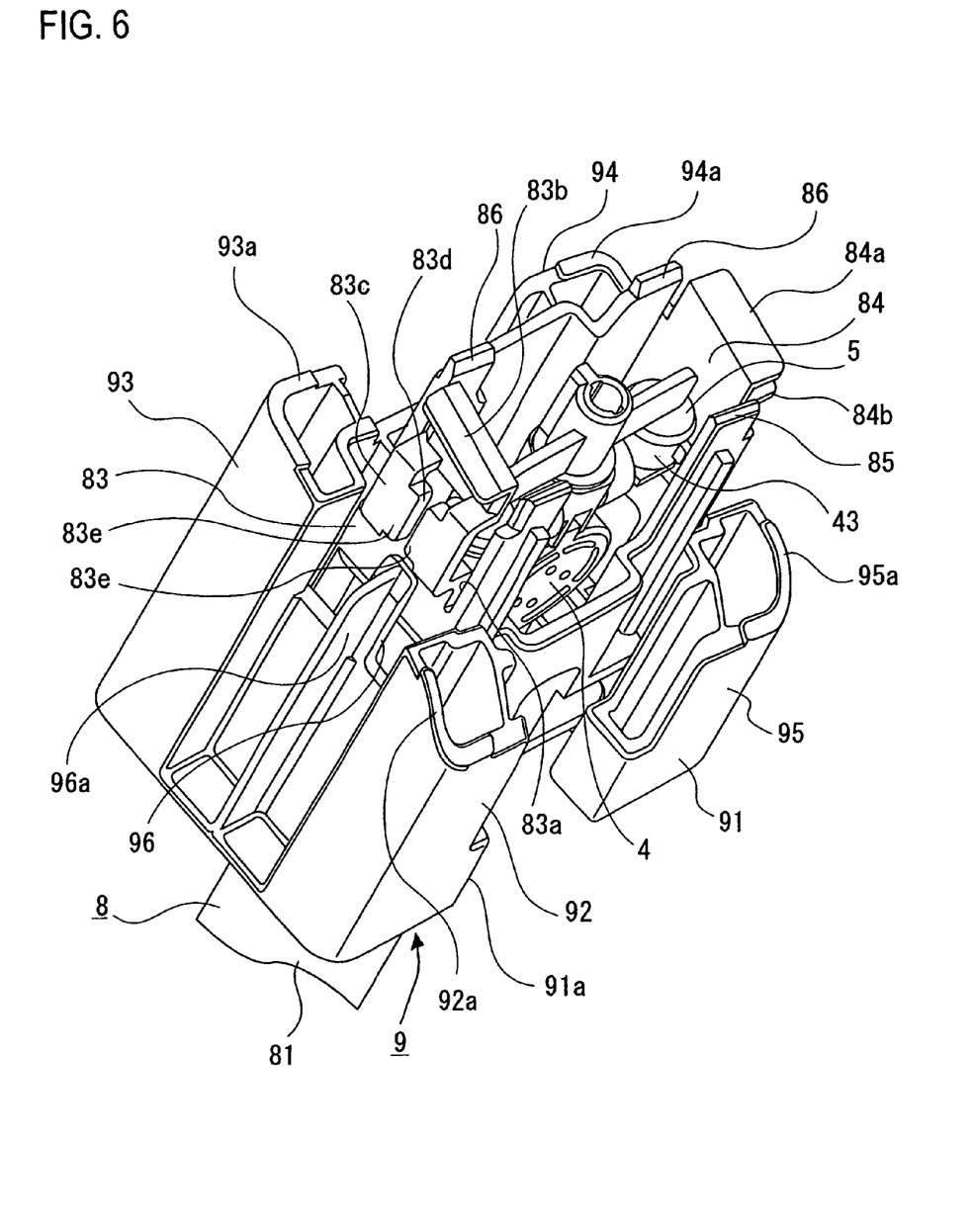
FIG. 6 is a perspective view showing the state, as seen from the front, immediately before the fixing member reaches a predetermined attachment position.

In the engagement arm element 83, as seen from FIG. 6, slits 83a are formed so as to extend toward the rear end of the positioning portion 82 from both side portions of the base portion of the engagement arm element 83, so that the engagement arm element 83 has elasticity in its thickness direction, thus being an elastic engagement arm element. In addition, the engagement arm element 83 is formed on its front end with an engagement piece 83b (see FIG. 2A) that projects outward, i.e., toward the opposite side from the other engagement arm element 84. Furthermore, the portion somewhat rearward from the front end of the engagement arm element 83 is formed so as to serve as a projected portion 83c (see FIGS. 3 and 6) that projects outwardly, and a slit 83d that extends in the longitudinal direction of engagement arm element 83 is formed at approximately the center of the projected portion 83c in the width direction. Both sides of the slit 83d are formed with engagement edges 83e.

The other engagement arm element 84 is designed so as to have a slight projection amount from the base portion 82a, so that the engagement arm element 84 has rigidity with substantially no deflection in the thickness direction. The engagement arm element 84 is provided on its front end with an engagement piece 84a (see FIGS. 2A and 6) that projects outward, i.e., toward the opposite side from the engagement arm element (or elastic arm element) 83. Furthermore, a holding piece 84b also projecting outwardly is formed on engagement arm element 84 at a position slightly rearward of the engagement piece 84a. The spacing between the engagement piece 84a and the holding piece 84b is (see FIG. 2B) set to be approximately equal to the thickness of the edge portion of the opening 11 that is formed in the vehicle body 10.

Figure 3:
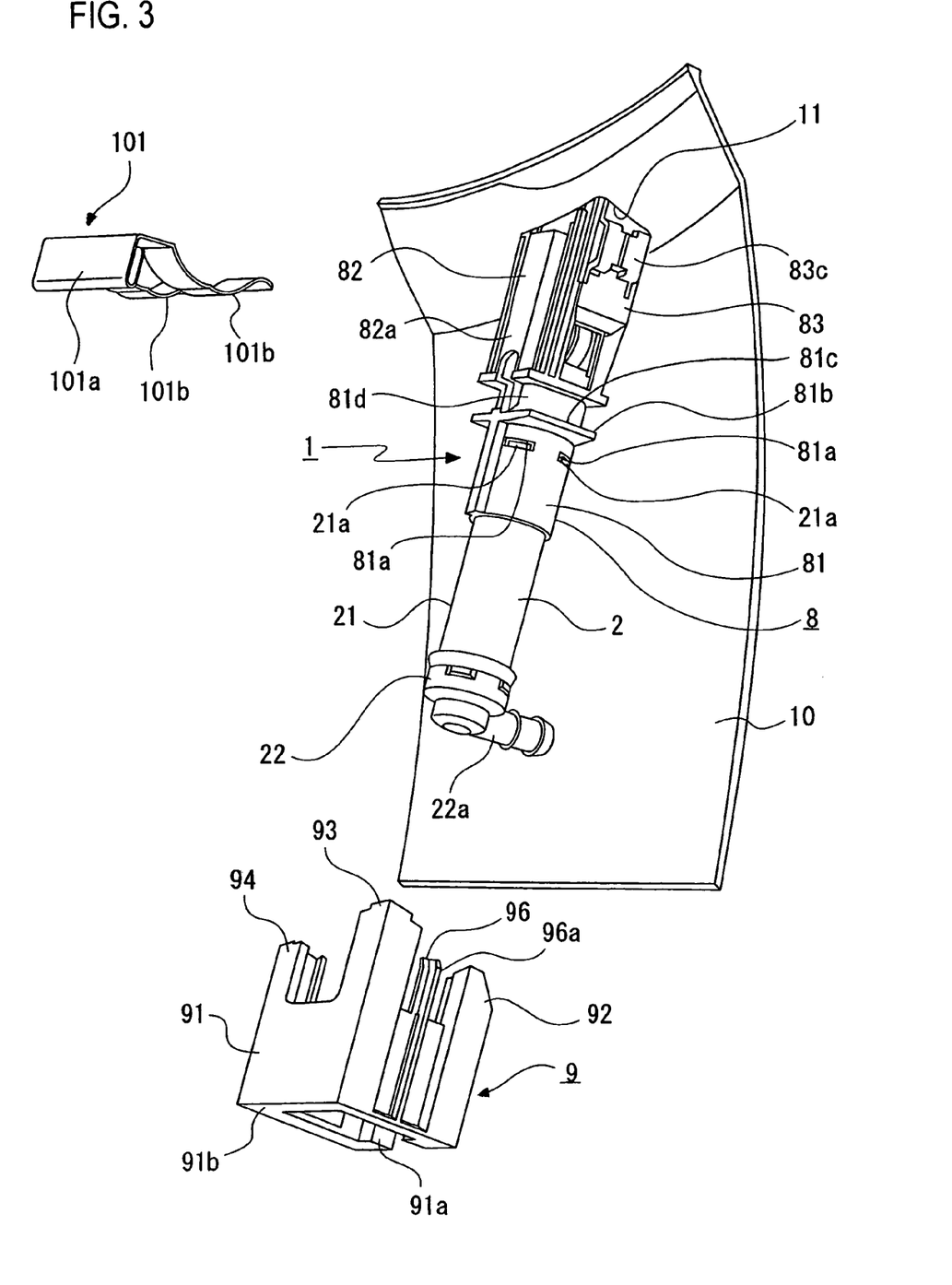
FIG. 3 is a perspective view showing, with the fixing member and clip spring, the front end portion of the bracket engaged with the opening seen from the inside (or behind)

The fixing member 9, as seen from FIG. 3, has a base portion 91, which has a square tube shape and includes a notch 91a that extends in the longitudinal direction at approximately the center of one side thereof. The rear end surface 91b of the base portion 91 of the fixing member 9 is a flat operation surface that is substantially perpendicular to the axial direction of the square tube shaped fixing member 9.

Projecting forward from four corners of the base portion 91 of the fixing member 9 are strut portions 92, 93, 94 and 95. Respective front ends 92a, 93a, 94a and 95a of the strut portions 92, 93, 94 and 95 make contact portions.

The fixing member 9 further has a deflection control piece 96 that projects forward from a position approximately intermediate between the strut portions 92 and 93. The deflection control piece 96 acts as a deflection control portion that controls (or prevents) the deflection of the engagement arm element 83 of the bracket 8. As seen from FIG. 6, the deflection control piece 96 has a plate shape with a narrow width and is formed with a deflection control projection 96a. The deflection control projection 96a extends in the longitudinal direction of the deflection control piece 96, and it is formed at approximately the center in the width direction of a surface of the deflection control piece 96 that faces the outer side. With the deflection control projection 96a, the deflection control piece 96 has an increased rigidity.

As seen from FIG. 3, the clip spring 101 is comprised of a base end portion 101a, which is in a substantially L-shape when viewed from the side, and elastic pieces 101b, which are spaced and parallel to each other and are formed to project out from the base end portion 101a. The elastic pieces 101b are curved such that their centers in the length direction project rearward with respect to the bracket 8 (and the fixing member 9).

The cleaning device 1 for a vehicular lamp described above is attached to the opening 11 of the vehicle body 10 in the manner as described below.

Figure 2A:
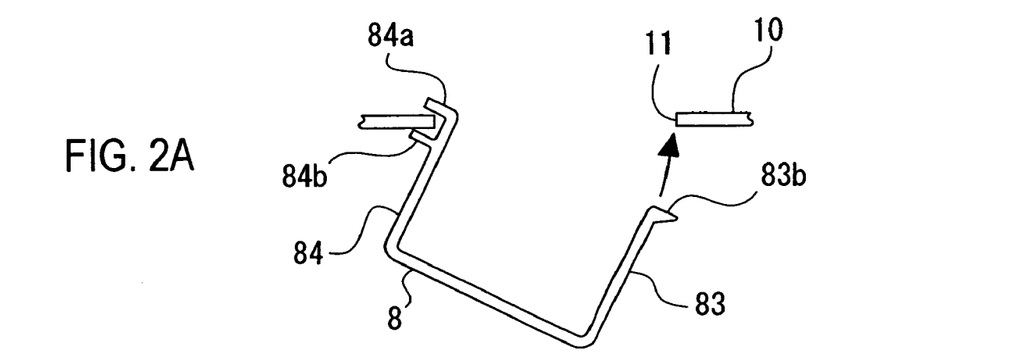
FIGS. 2A through 2D are schematic diagrams showing the steps for engaging the front end portion of the bracket to the opening in the successive order.

First, as shown in FIG. 2A, the bracket 8 is set so that the engagement piece 84a and holding piece 84b of its engagement arm element 84, which does not have elasticity, hold the edge portion of the opening 11 that is at one end of the opening 11 in the lengthwise direction.

In FIG. 2A and FIGS. 2B through 2D, only a portion of the bracket 8 and a portion of the fixing member 9 are shown, and illustrations of other portions are omitted.

Figure 2B:
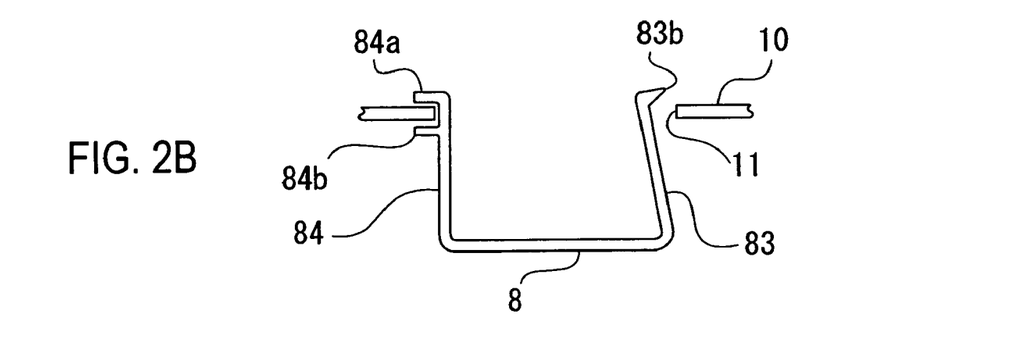

Next, as seen from FIG. 2B, while holding one edge portion of the opening 11 with the front end portion of the engagement arm element 84 of the bracket 8 as described above, the elastic engagement arm element 83 of the bracket 8 is deflected toward the inner side, that is, toward the engagement arm element 84, and the engagement piece 83*b* of the elastic engagement arm element 83 is brought to the front side of the other edge portion of the opening 11.

With the engagement piece 83*b* passed through the edge of the opening 11 as shown in FIG. 2B, a force deflecting the engagement arm element 83 is removed, thus allowing the elastic engagement arm element 83 to return to its original state, that is, to the state in which no particular force is applied. As a result, as shown in FIG. 2C, the engagement piece 83*b* of the elastic engagement arm element 83 of the bracket 8 engages the front side of the edge portion of the opening 11 that is an opposite edge from (or another end in the lengthwise direction of) the edge portion of the opening 11 with which the engagement piece 84*a* and the holding piece 84*b* of the engagement arm element 84 are engaged.

Figure 2C:
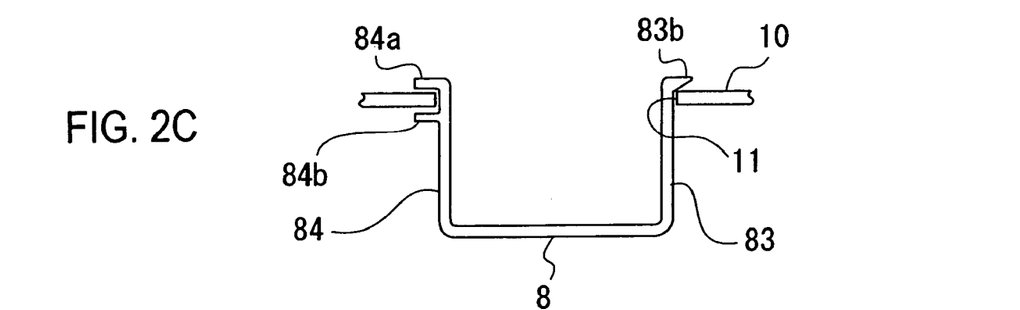
Figure 4:
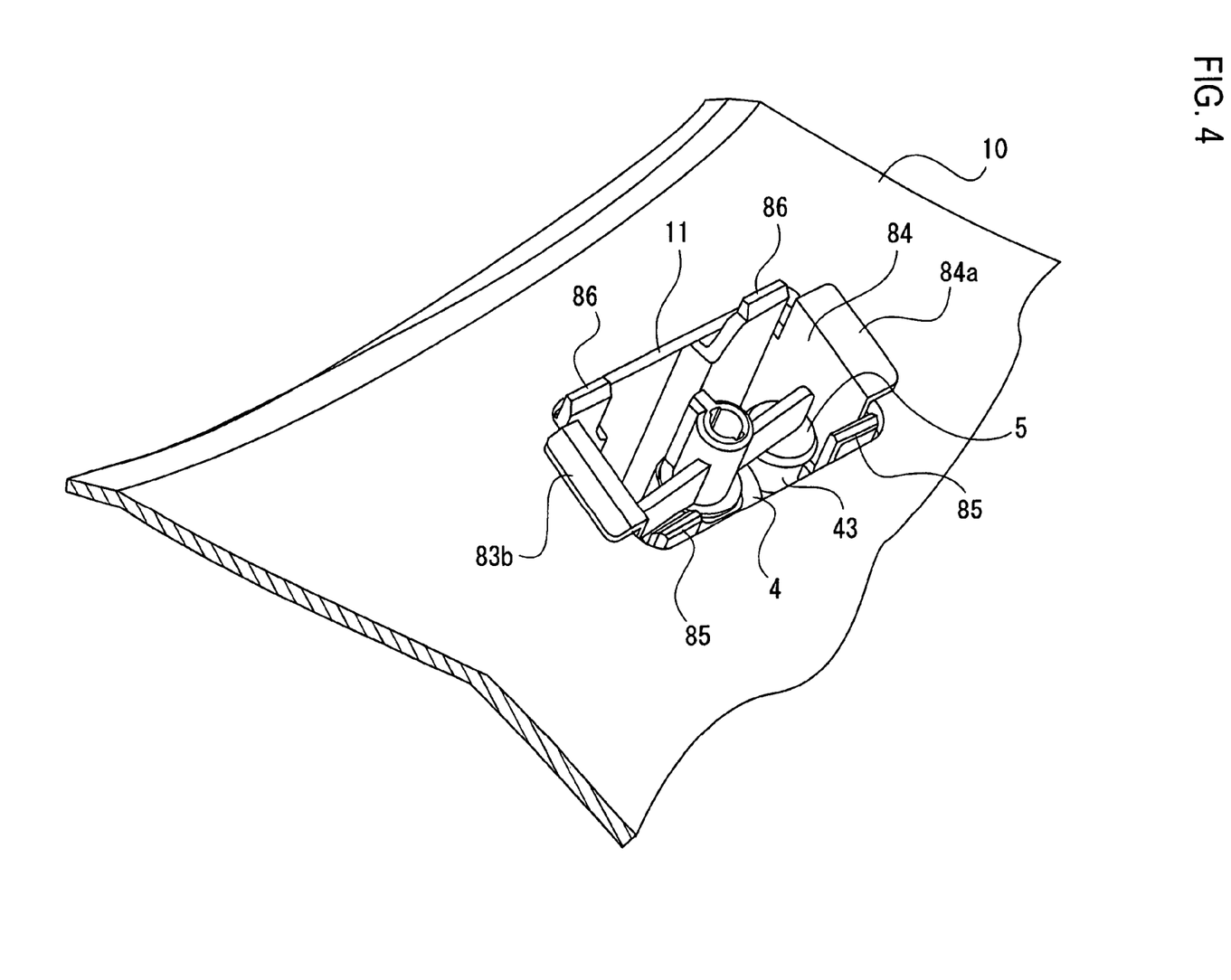
FIG. 4 is a perspective view showing the front end portion of the bracket engaged with the opening seen from the outside.

The front end portions of the bracket 8 are thus engaged with the edge portions of the opening 11 as shown in FIG. 2C, and FIGS. 3 and 4 respectively show the rear and front views of this engaged state.

When the front end portions of the bracket 8 are thus engaged with the edge portions of the opening 11, a state in which the four positioning pieces 85 and 86 of the bracket 8 are in contact with the edge of the opening along the lengthwise direction of the opening 11 is attained; and the bracket 8 is accurately positioned at the opening 11. In the shown structure, widths of the engagement arm elements 83 and 84 are substantially equal to the respective lengths of the edges positioned on both ends of the opening 11 in the lengthwise direction, and the four positioning pieces 85 and 86 are in contact with the opening edge of the opening 11 along the lengthwise direction of the opening 11. Accordingly, the rotation of the front end portion of the bracket 8 is prevented.

Figure 5:
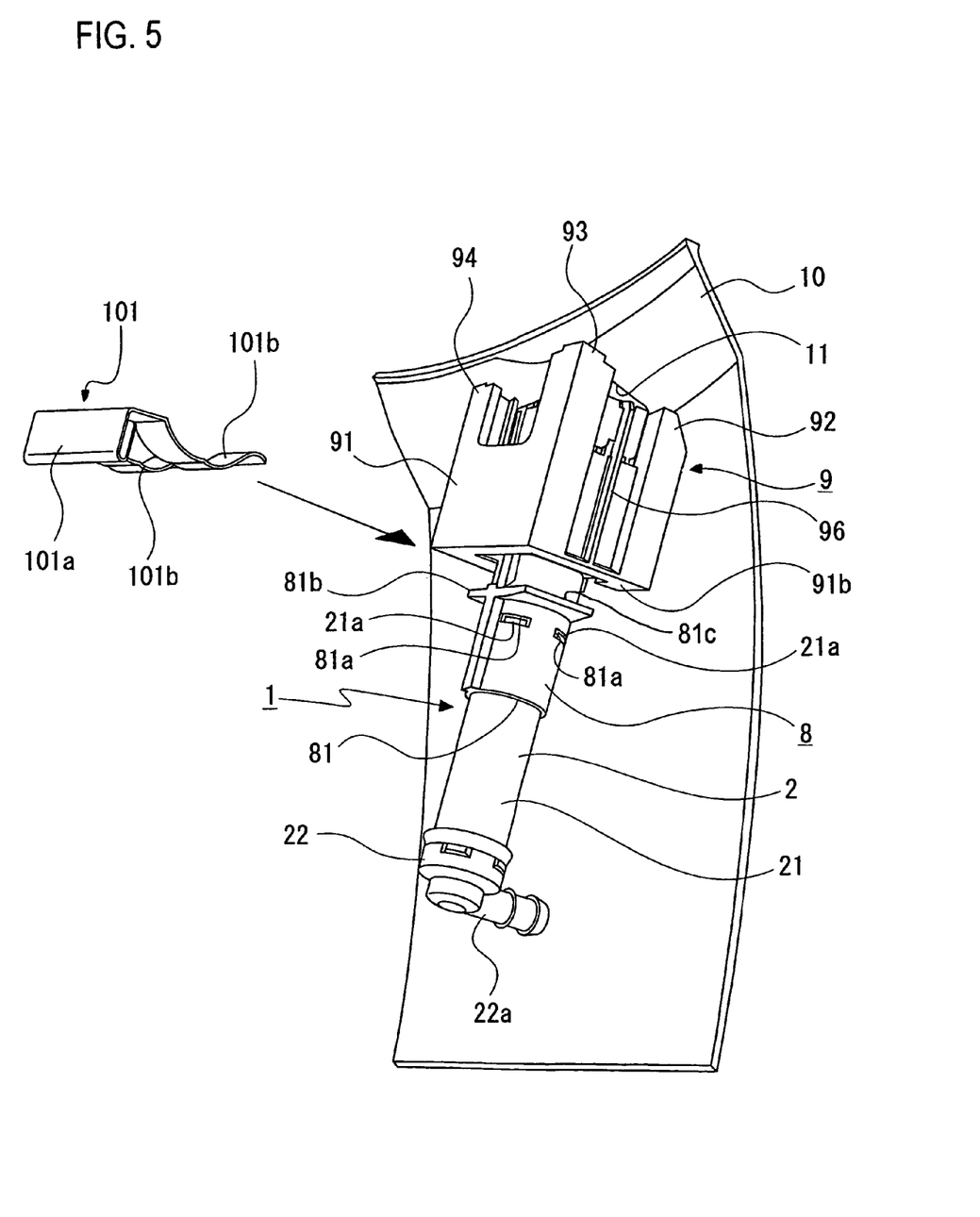
FIG. 5 is a perspective view showing the state in which the edge portions of the opening are held at the front and rear by the front end portion of the bracket and the fixing member, with the clip spring shown with an arrow indicative of the clip spring installation position.

As shown in FIGS. 3 and 4, keeping the state that the front end portion of the bracket 8 is engaged (and in contact) with the edge portion of the opening 11, the fixing member 9 is outwardly fitted (or covered) on the cylinder 2 from behind the cylinder 2. When the fixing member 9 is thus fitted on the cylinder 2, the cleaning fluid supply duct 22*a* of the cylinder 2 passes through the notch 91*a* of the base portion 91 of the fixing member 9; and the front end of the fixing member 9, i.e., the contact portions 92*a*, 93*a*, 94*a* and 95*a* of the four strut portions 92, 93, 94 and 95 of the fixing member 9, come in contact with the rear surface of the edge portion of the opening 11. FIG. 5 shows the contact portions 92*a*, 93*a*, 94*a* and 95*a* of the four strut portions 92, 93, 94 and 95 in contact with the rear surface of the edge portion of the opening 11.

During the period after the fixing member 9 is outwardly fitted on the cylinder 2 until the state shown in FIG. 5 is attained, the distal end of the deflection control piece 96 of the fixing member 9 faces the inner side of the engagement edges 83*e* formed on the projected portion 83*c* of the engagement arm element 83 of the bracket 8 (i.e., faces the opposite from the projection side of the projected portion 83*c*); and the deflection control projection 96*a* formed on the deflection control piece 96 of the fixing member 9 faces the rear end of the slit 83*d* of the projected portion 83*c* of the bracket 8 (see FIG. 6). When the contact portions 92*a*, 93*a*, 94*a* and 95*a* of the fixing member 9 are in contact with the rear surfaces of the edge portions of the opening 11 as shown in FIG. 5, the deflection control piece 96 is completely in the inner side of the engagement edges 83*e* of the engagement arm element 83 of the bracket 8 as shown in FIG. 7, and the deflection control projection 96*a* of the deflection control piece 96 of the fixing member 9 is inside the slit 83*d* which is between the engagement edges 83*e* and 83*e*.

Figure 2D:
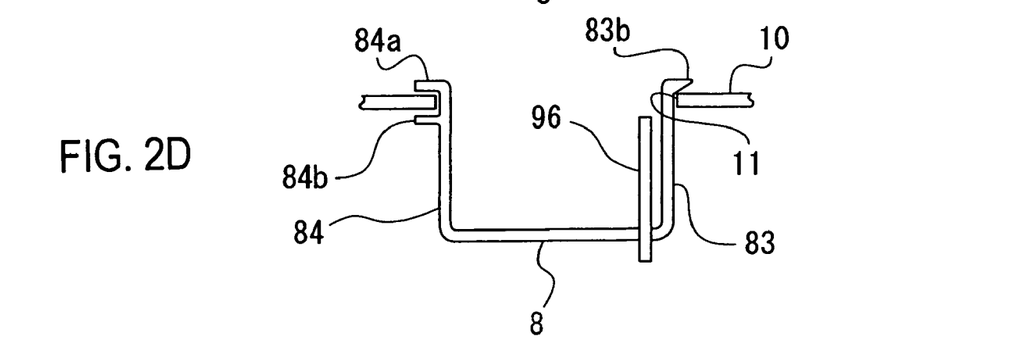
Figure 7:
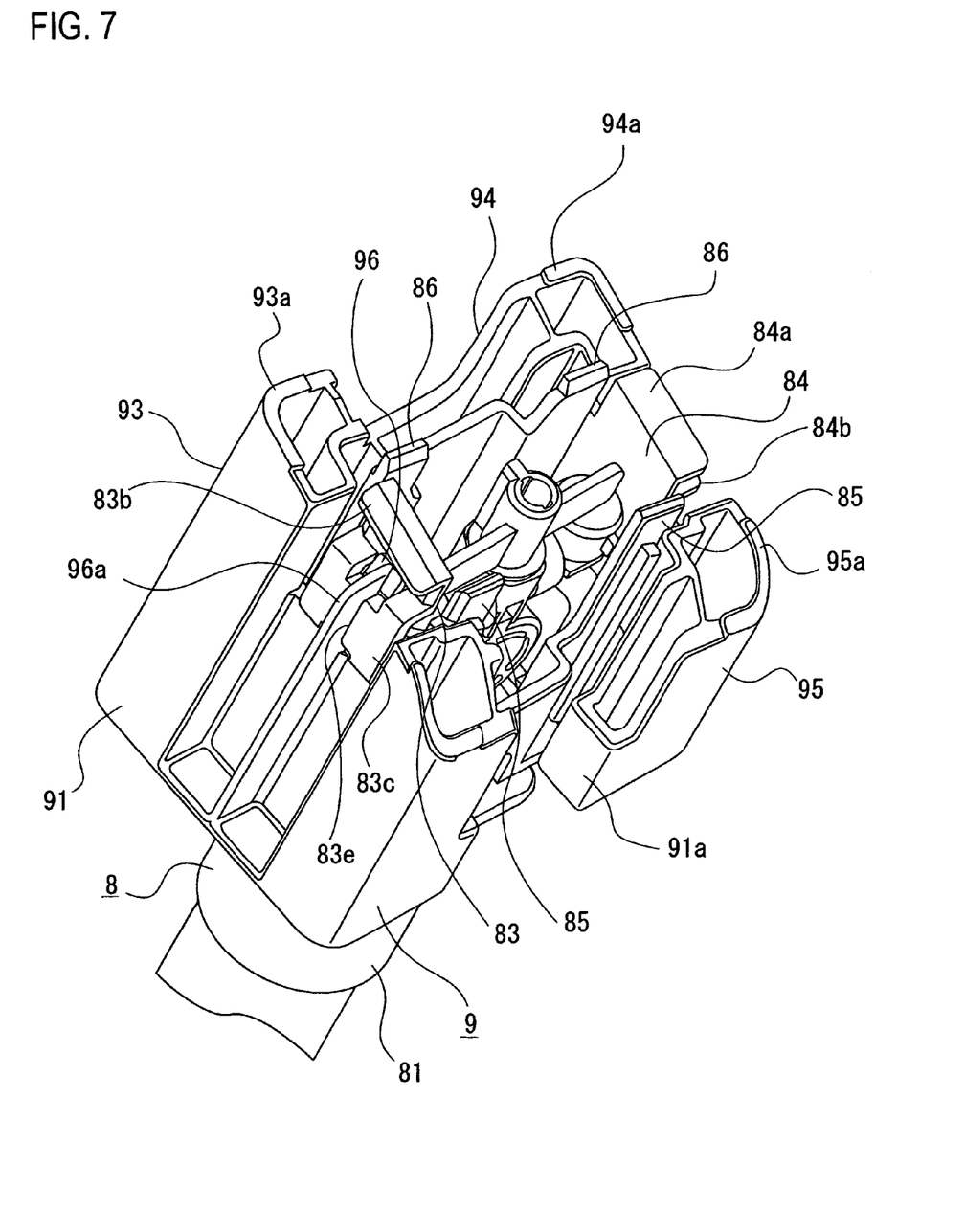
FIG. 7 is a perspective view showing the state, as seen from the front, in which the fixing member has reached the predetermined attachment position.

Once the deflection control piece 96 of the fixing member 9 is, as described above, completely inside the engagement edges 83*e* of the engagement arm element 83 of the bracket 8 as shown in FIG. 7, the deflection control piece 96 is positioned on the inner side of the engagement arm element 83 as shown in FIG. 2D and thus prevents the engagement arm element 83 from falling or bending toward the inner side. Accordingly, disengagement of the engagement piece 83*b* of the engagement arm element 83 of the bracket 8 from the front surface of the edge portion of the opening 11 is prevented.

In order to secure the state shown in FIG. 5 in which the edge portions of the opening 11 are held from the front and behind (or from the outside and inside) by the engagement pieces 83*b* and 84*a* of the bracket 8 and the contact portions 92*a*, 93*a*, 94*a* and 95*a* of the fixing member 9, the clip spring 101 is brought to be interposed between the support surface 81*c* of the bracket 8 and the operation surface 91*b* of the fixing member 9, as shown by an arrow in FIG. 5. When the clip spring 101 is thus interposed, a state shown in FIG. 8 is attained in which the neck portion 81*d*, which is between the support surface 81*c* (see FIG. 3) and the base portion 82*a* of the positioning portion 82 of the bracket 8, is positioned between two elastic pieces 101*b* of the clip spring 101.

Figure 8:
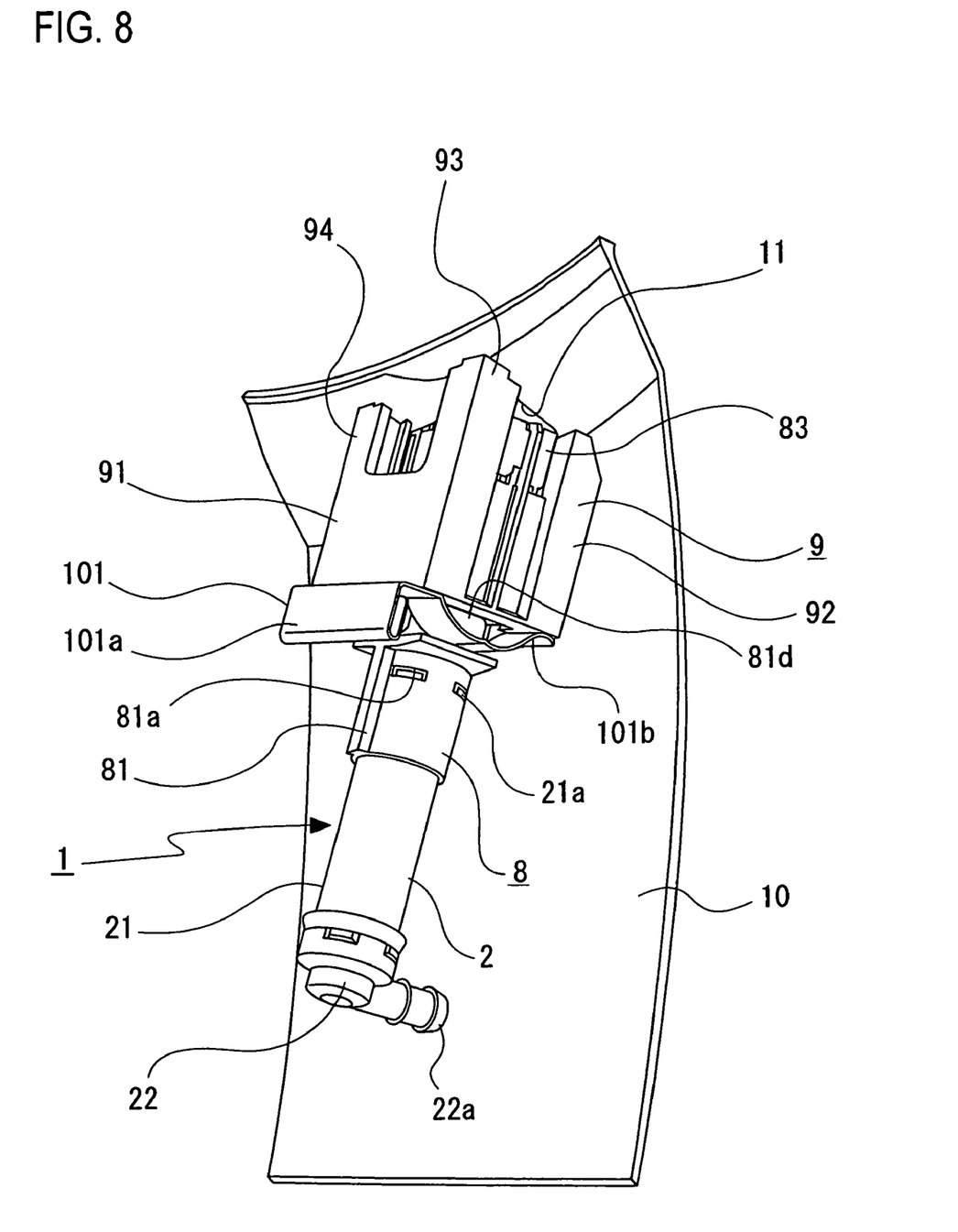
FIG. 8 is a perspective view showing the state, seen from the behind, in which the cleaning device is attached to the opening.

Once the clip spring 101 is interposed between the support surface 81*c* of the bracket 8 and the operation surface 91*b* of the fixing member 9 as shown in FIG. 8, the curved state of the elastic pieces 101*b* changes to a state in which the elastic pieces 101*b* are pushed and flattened from the front and behind. The fixing member 9 is thus biased or urged forward by the reaction force generated by the elastic pieces 101*b* of the clip spring 101 accordingly. As a result, the edge portions of the opening 11 are firmly held by the contact portions 92*a*, 93*a*, 94*a* and 95*a* of the fixing member 9 and by the engagement pieces 83*b* and 84*a* of the bracket 8; and the cylinder 2 is reliably secured to the vehicle body 10 via the opening 11.

In the above-described structure, the clip spring 101 is used as an elastic member that is interposed between the support surface 81*c* of the bracket 8 and the operation surface 91*b* of the fixing member 9. This, however, does not mean the elastic member is limited to the clip spring 101. Nonetheless, use of the clip spring 101 as the elastic member is good for workability when the cylinder 2 is removed from the vehicle body 10 for repairs or the like.

As to the position where an elastic member such as the clip spring 101 is provided, it is preferable that it be installed at relatively separated location from the opening 11. More specifically, when an external force is applied to the cylinder 2, the cylinder 2 receives a circular force centered on the engagement locations of the opening 11 and the front end portion of the bracket 8; and with the elastic member provided at a position away from the engagement locations, the elastic force strongly acts such that the elastic member is less likely to deviate from the set position. In addition, it is preferable that the elastic member is provided at approximately a center of gravity position of the structural body that includes the cylinder 2, the piston 3, the check valve portion 4, and the nozzle bodies 5.

Figure 9:
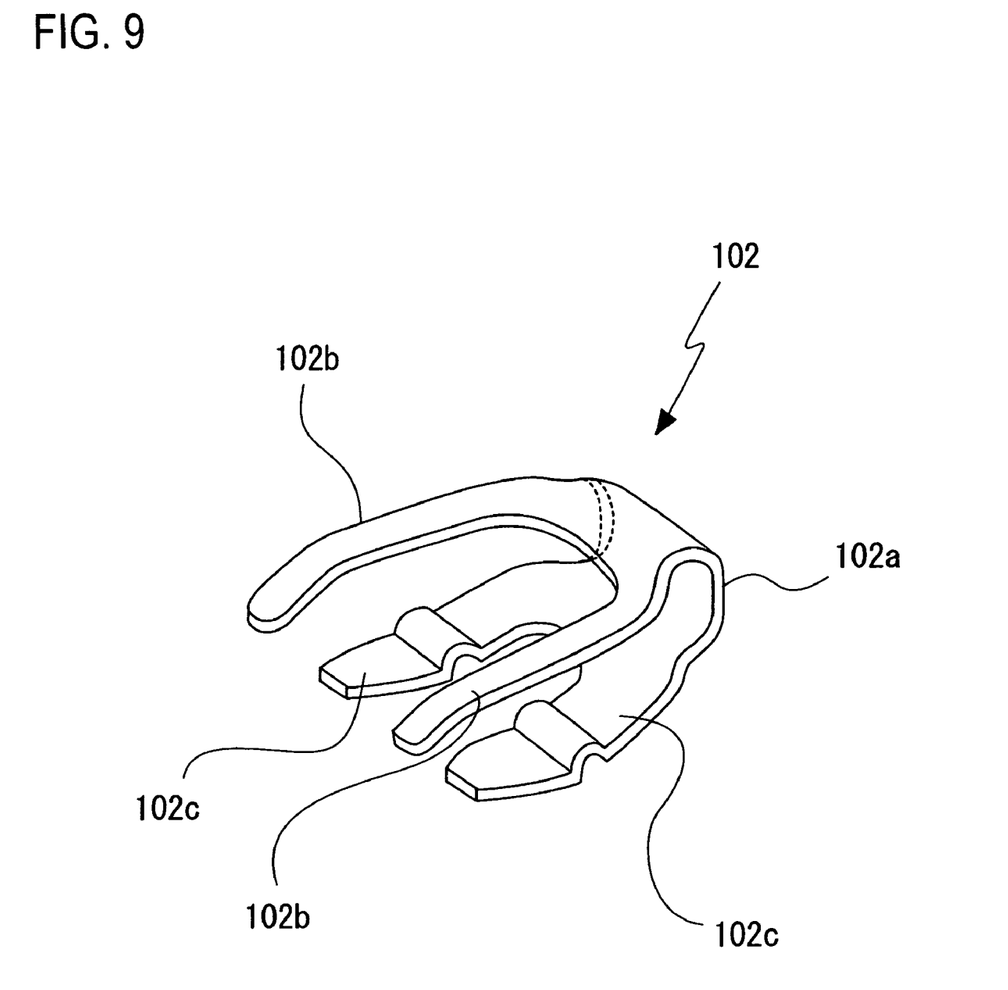
FIG. 9 is a perspective view of a modified clip spring.

FIG. 9 shows a modified clip spring.

The clip spring 102 shown in FIG. 9 is formed such that a plate spring material is bent into a substantially lateral U-shape, when viewed from the side, with a base end portion 102a at the center. Upper elastic pieces 102b and lower upper elastic pieces 102c that extend substantially parallel to each other protrude from both upper and lower ends of the base end portion 102a, i.e., a curved portion.

The clip spring 102 is interposed between the support surface 81c of the bracket 8 and the operation surface 91b of the fixing member 9 so that the neck portion 81d of the bracket 8 is between the upper elastic pieces 102b and between the lower elastic pieces 102c. As a result, the upper elastic pieces 102b are in elastic contact with the operation surface 91b of the fixing member 9, and the lower elastic pieces 102c are in elastic contact with the support surface 81c of the bracket 8.

As seen from the above, according to the cleaning device 1 for a vehicular lamp of the present invention, the engagement pieces 83b and 84a of the bracket 8 and the contact portions 92a, 93a, 94a, 95a of the fixing member 9 hold the edge portions of the opening 11 from the front and behind (or from the outside and inside). Accordingly, the front end portion of the bracket 8 is securely positioned and fixed to the opening 11, no localized load is applied to some particular members or portions, and deflection in a direction that disengages the elastic arm element 83 from the edge portion of the opening is prevented. Consequently, the front end portion of the bracket 8 is prevented from being misaligned with respect to the opening 11.

In addition, the engagement pieces 83b and 84a of the elastic arm element 83 of the bracket 8 are engaged with the front side of the edge portion of the opening 11 with the elastic arm element 83 being deflected state toward the other arm element 84, and then the fixing member 9 is positioned so as to outwardly fitted on (or to cover) the bracket 8 from behind, and further the deflection control piece 96, a deflection control portion, of the fixing member 9 is set at a position that prevents the deflection of the elastic engagement arm element 83. Accordingly, work to position and fix the bracket 8 to the opening 11 can be done easily.

Furthermore, the engagement arm element 84 of the bracket 8 has rigidity that prevents disengagement of the engagement piece 84a from the edge portion of the opening 11, and it also has the holding piece 84b that is in contact with the rear side of the edge portion of the opening 11 to sandwich the edge portion from front and behind in cooperation with the engagement piece 84a. Accordingly, the engagement arm element 84 is assuredly engaged with the edge portion of the opening 11, and the front end portion of the bracket 8 is prevented from being misaligned with respect to the edge portion of the opening 11.

Moreover, the rear end portion of the fixing member 9 has the operation surface 91b that faces substantially parallel to the flat support surface 81c formed on the bracket 8, and the clip spring 101 or 102, i.e., an elastic member, is interposed between the support surface 81c of the bracket 8 and the operation surface 91b of the fixing member 9. Accordingly, the front end portion of the bracket 8 is easily engaged and disengaged with the opening 11; and once the front end portion of the bracket 8 is engaged with the opening 11, the engagement state is kept assuredly.

The front end of the check valve portion 4 is provided with the nozzle cover 7, and this the nozzle cover 7 covers the front ends of the nozzles 5 (only one nozzle 5 is shown in FIGS. 1 and 4) as well as the opening 11 from the front when the nozzle 5 are not in use. Accordingly, laterally separated ribs can be formed on the respective top and bottom sides of the nozzle cover 7, so that when the piston 3 is retracted inside the cylinder 2 and the opening 11 is covered by the nozzle cover 7, the ribs on the nozzle cover 7 come in contact with the positioning pieces 85 and 86 of the bracket 8. Thus, it is possible that positioning of the nozzle cover 7 is made with respect to the opening 11 by way of the ribs formed on the nozzle cover 7.

The shapes and structures of the respective portions in the above embodiments are all but mere examples for carrying out the present invention and must not be construed as limiting the technical scope of the present invention in any manner.

The invention claimed is:

1. A cleaning device for a vehicular lamp comprising:
   a piston provided at a distal end thereof with a spray nozzle that sprays a cleaning fluid and a nozzle cover that forwardly covers the spray nozzle, and
   a cylinder that drives the piston to extend and refract with respect to an opening formed in a vehicle body; wherein said cleaning device further comprises:
   a bracket that is attached to the cylinder and positions the cylinder in the opening,
   a fixing member that is positioned on the bracket in an outwardly fitted manner, and
   an elastic member that is disposed between the bracket and the fixing member; and wherein
   the bracket has a pair of arm elements having engagement pieces that engage with front side of edge portions of the opening that are positioned mutually opposed, at least one of the pair of arm elements being an elastic arm element having elasticity in a direction of engagement and disengagement with respect to the edge portion of the opening,
   the fixing member has a plurality of contact portions, which are in contact with a rear side of the edge portion of the opening, and a deflection control portion, which prevents deflection of the elastic arm element in a direction of disengagement from the opening; and
   the engagement pieces of the bracket and the contact portions of the fixing member hold the edge portion of the opening, and
   the elastic member is provided between the bracket and the fixing member such that the fixing member is biased toward the opening in a state that the deflection total portion of the fixing member prevents deflection of the elastic arm element of the bracket.

2. The cleaning device for a vehicular lamp according to claim 1, wherein:
   the engagement pieces of the pair of arm elements are engaged with the front side of the edge portions of the opening in a state that the elastic arm element is deflected toward another arm element, and
   the fixing member is subsequently positioned on the bracket from behind in an outwardly fitted manner, and the deflection control portion is inserted to a position at which the deflection control portion prevents deflection of the elastic arm element.

3. The cleaning device for a vehicular lamp according to claim 2, wherein:
   the other of said pair of arm elements has rigidity that substantially prevents deflection in a direction of engagement and disengagement thereof with respect to the edge portion of the opening and has a holding piece that is in contact with the rear side of the edge portion of the opening in order to sandwich the edge portion from front and behind in cooperation with the engagement piece.

4. The cleaning device for a vehicular lamp according to any one of claims 1 to 3, wherein:

a rear end portion of the fixing member is provided with an operation surface that faces substantially parallel to a flat support surface formed on the bracket, and the elastic member is a spring and is interposed between the operation surface of the fixing member and the support surface of the bracket.

5. The cleaning device for a vehicular lamp according to any one of claims 1 to 3, wherein said elastic member is a clip spring comprised of a base end portion which is in a substantially L-shaped when viewed from the side and elastic pieces which are spaced apart and parallel to each other and projecting from said base end portion, each of said elastic pieces being curved such that a center thereof in a lengthwise direction projects rearwardly with respect to said bracket.

* * * * *